United States Patent
Nayfeh et al.

(10) Patent No.: US 9,047,610 B1
(45) Date of Patent: Jun. 2, 2015

(54) METHOD AND APPARATUS FOR CORRELATING PRODUCTS BASED UPON LOGICAL RELATIONS BY PRODUCT ATTRIBUTES AND OPTIONALLY WITH CUSTOMER DATA PURCHASES

(75) Inventors: Basem Nayfeh, Sunnyvale, CA (US); Cheng Che Chen, Mountain View, CA (US); Yaser M. Haddara, San Jose, CA (US); Maciek Kozyrczak, Los Altos, CA (US)

(73) Assignee: AudienceScience Inc., Bellevue, WA (US)

( * ) Notice: Subject to any disclaimer, the term of this patent is extended or adjusted under 35 U.S.C. 154(b) by 1784 days.

(21) Appl. No.: 12/185,761

(22) Filed: Aug. 4, 2008

Related U.S. Application Data

(63) Continuation of application No. 11/499,883, filed on Aug. 3, 2006, now abandoned, which is a continuation of application No. 09/629,252, filed on Jul. 27, 2000, now abandoned.

(51) Int. Cl.
*G06Q 30/00* (2012.01)
*G06Q 30/02* (2012.01)

(52) U.S. Cl.
CPC .................................... *G06Q 30/02* (2013.01)

(58) Field of Classification Search
CPC ....................................................... G06Q 30/02
See application file for complete search history.

(56) References Cited

U.S. PATENT DOCUMENTS

| | | | |
|---|---|---|---|
| 6,112,186 A * | 8/2000 | Bergh et al. | 705/10 |
| 6,236,990 B1 * | 5/2001 | Geller et al. | 707/5 |
| 6,313,745 B1 * | 11/2001 | Suzuki | 340/572.1 |
| 6,321,221 B1 * | 11/2001 | Bieganski | 707/5 |
| 6,412,012 B1 * | 6/2002 | Bieganski et al. | 709/232 |

FOREIGN PATENT DOCUMENTS

| | | |
|---|---|---|
| WO | WO 00/17792 A1 | 3/2000 |
| WO | WO 00/17793 A1 | 3/2000 |

* cited by examiner

*Primary Examiner* — Arthur Duran
(74) *Attorney, Agent, or Firm* — Perkins Coie LLP

(57) ABSTRACT

A method for generating a list of recommendations to be supplied by a vendor to a prospective customer by the use of a computer comprising the steps of inputting into a searchable data set a plurality of products and attributes of each product. A product is. The attributes of the selected product are ascertained. All products are ascertained that match at least one of the attributes of the selected product to provide looked-up products. From the looked-up products then are selected all products that are the closest match to the selected product to provide best matches. An output list of best matches of correlated products from the looked-up products is generated.

35 Claims, 3 Drawing Sheets

METHOD AND APPARATUS FOR CORRELATING PRODUCTS BASED UPON LOGICAL RELATIONS BY PRODUCT ATTRIBUTES AND OPTIONALLY WITH CUSTOMER DATA PURCHASES

This application is a continuation application of U.S. patent application Ser. No. 11/499,883 filed Aug. 3, 2006, entitled METHOD AND APPARATUS FOR CORRELATING PRODUCTS BASED UPON LOGICAL RELATIONS BY PRODUCT ATTRIBUTES AND OPTIONALLY WITH CUSTOMER DATA PURCHASES, which is a continuation of U.S. patent application Ser. No. 09/629,252 filed Jul. 27, 2000, each of which is hereby incorporated by reference in its entirety.

This invention relates to a method and apparatus for correlating products based upon logical relations by product attributes and optionally with customer purchases data.

Lists of the customer recommendations have heretofore been generated. However, they have been principally relied upon for collaborative filtering of purchase data and typically recommend products to customers based on what other purchasers have purchased. Thus very often, such a list may contain product recommendations in which the products are unrelated to each other and of no interest to the customer. There is therefore a need for a new and improved method and apparatus for overcoming this deficiency in prior art methods.

In general, it is an object of the present invention to provide a method and apparatus for correlating products which are based upon logical relations by product attributes.

Another object of the invention is to provide a method and apparatus of the above character in which the correlated products optionally are prepared in conjunction with customer data purchases.

Another object of the invention is to provide a method and apparatus of the above character in which the recommendations incorporate knowledge about how products relate to each other.

Another object of the invention is to provide a method and apparatus of the above character in which the customer lists can be further tailored by a vendor to meet further specific vendor requirements.

Additional objects and features of the invention will appear from the following description in which the preferred embodiments are set forth in detail in conjunction with the accompanying drawings.

In general, the method of the present invention is utilized for generating a list of at least one of correlated products to be supplied by a vendor to a prospective customer by the use of a computer. The method comprises inserting into searchable data sets at least a list of products and their attributes and optionally purchase data on the products. The method further comprises selecting a product in the data sets and ascertaining the attributes of that product from the data sets. In an optional step, all of the products are located that were purchased by a purchaser who purchased the selected product to provide additional selected products. The additional selected products are ranked by a predetermined correlation index. Whether or not there is insufficient purchase data to provide additional selected products, looked-up products are ascertained from the data sets by selecting all the products that match at least one of the attributes of the selected product to provide looked-up products. From the looked-up products there are selected all products that are the closest matches to the selected product utilizing predetermined attribute related criteria or alternatively selecting from the additional selected products all products that match the selected product in at least one attribute. An output list of at least one of the best matches from the looked-up products and the additional selected products is then created. The same steps can be repeated for other selected products to prepare additional output lists. All of the best matches for a selected product are ranked according to vendor-assigned desirability. Thereafter the top "n" products from the ranked recommendations are selected and a list of products and their related recommendations for a customer is delivered to the vendor.

Figure 1:
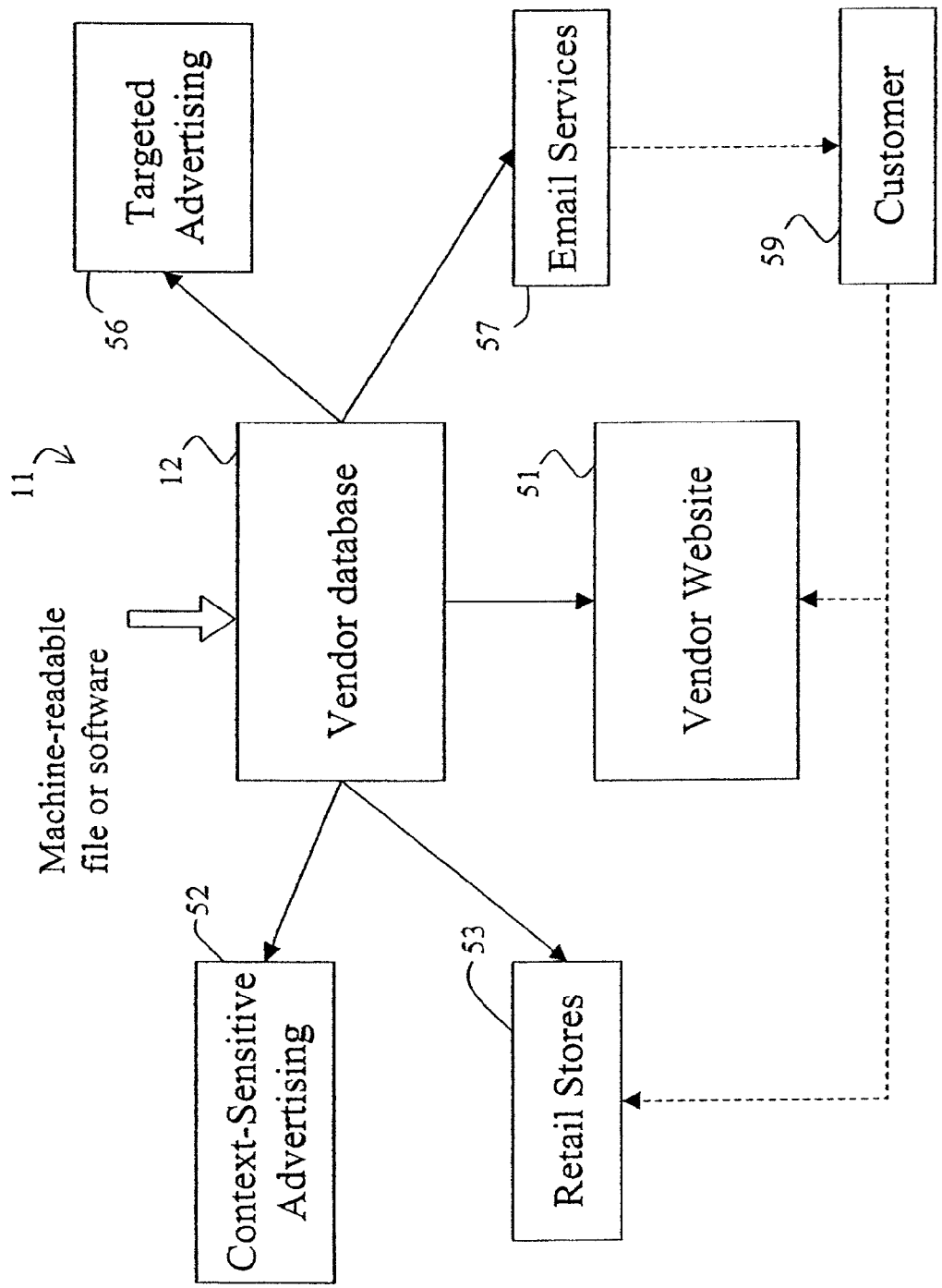
FIG. 1 is a block diagram of a sample apparatus that may be utilized by a vendor to benefit from the present invention.

More particularly, the apparatus 11 of the present invention as shown in FIG. 1 includes a vendor database 12. The vendor database can be of a conventional type and can include a computer which is capable of assimilating a large database which is accessible through one or more servers at the vendor site or sites. The data generated by a supplier of the present invention can be delivered by electronic file transfer from a hard disk to a vendor for placing on the vendor database or alternatively, the software can be placed on a compact disk or other portable storage medium and delivered physically to the vendor. For updating the database, the vendor can be supplied with data on follow-up disks physically delivered to the vendor or alternatively downloaded by the vendor from the software supplier through a secure server. The vendor can obtain access through the secure server by the use of appropriate passwords and access privileges made known to the vendor by the software supplier. Alternatively, the database may be completely hosted by a supplier of the present invention with no need for transfer of data to the vendor site. In such a case, the supplier would provide the vendor with a protocol giving the vendor the capability to specify the communication of recommendations from the supplier of the present invention to the final customer on demand.

Figure 2:
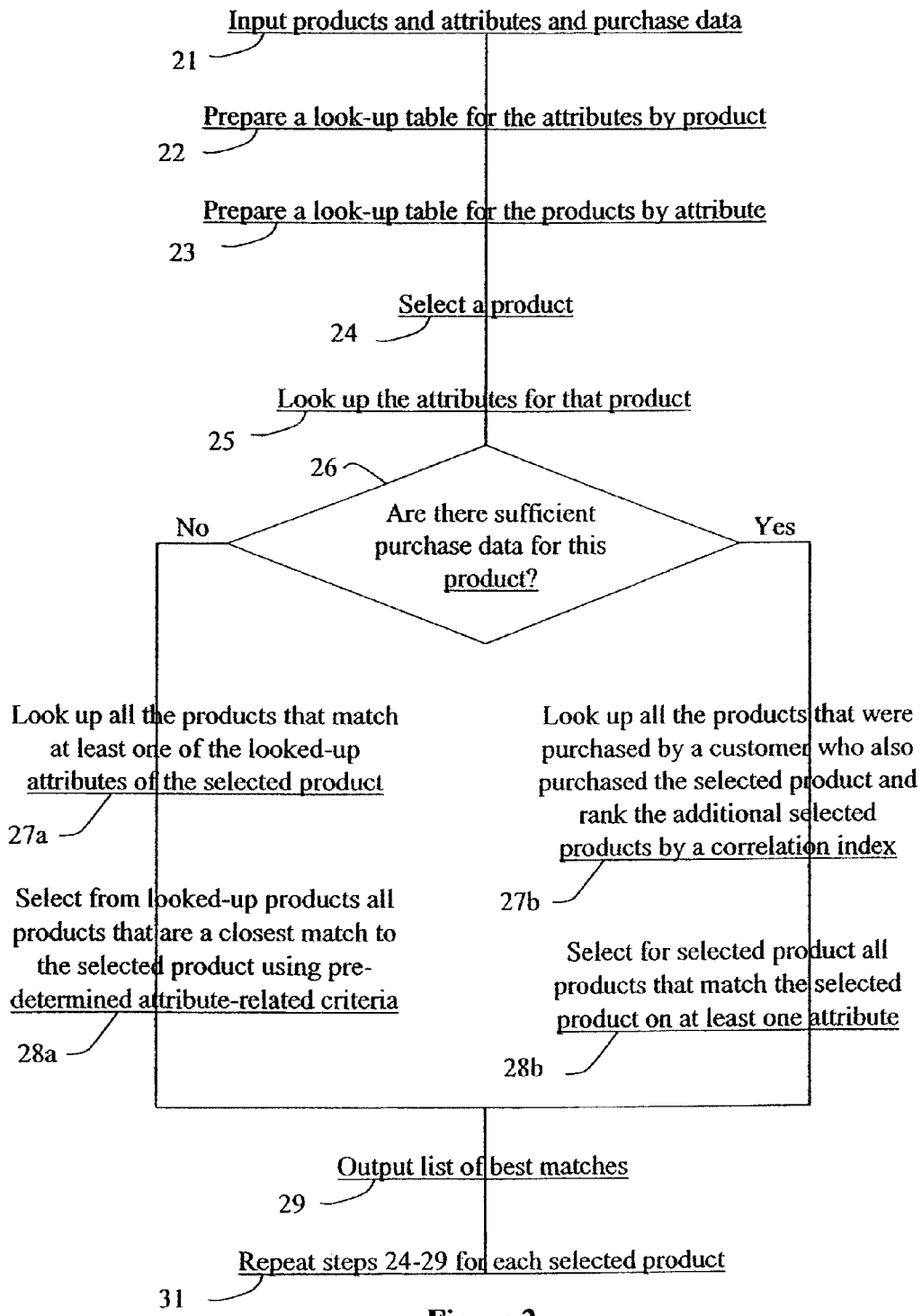
FIG. 2 is a flow chart showing the steps used in implementing the method of the present invention.
Figure 3:
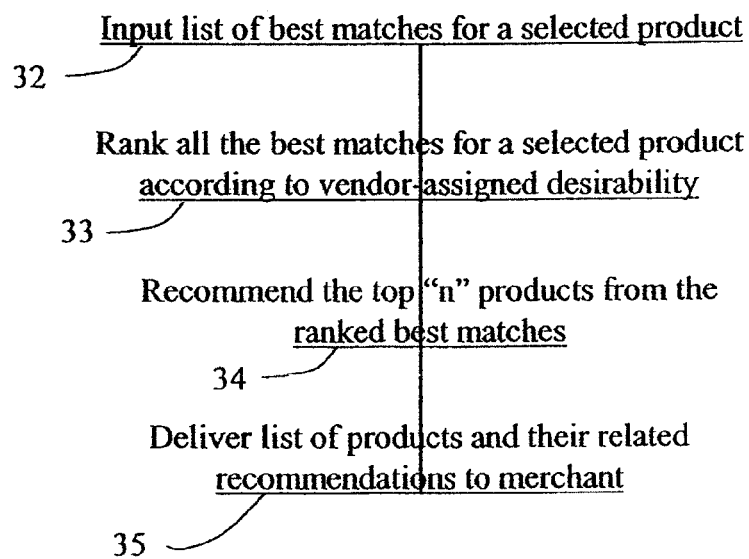
FIG. 3 is a flow chart showing how a best match list is utilized to generate a list of products and related recommendations to the vendor for supplying to a prospective customer.

With this background on vendor capabilities, the method of the present invention can be described in detail in conjunction with the steps set forth in the flow chart shown in FIG. 2 which shows the steps for generation of a best match list and FIG. 3 which shows the steps showing how the best match list is utilized to generate a list of products and related recommendations to the vendor for supplying to a prospective customer.

In accordance with the method, vendor or merchant files are received as for example by delivery of a CD physically delivered to the software supplier or alternatively downloaded onto the server of the software supplier. These vendor files typically will contain a list of all the products of the vendor, the attributes the vendor attaches to these products and vendor purchase histories of those products. This information typically would also include every purchase made of products of the vendor within a particular time frame so that each purchase has a record in the file with the record containing a unique encoded identifier which identifies the customer that made the purchase, a unique encoded identifier that identifies the product that was purchased and the date of the purchase, In this way confidential information in the possession of the vendor need not be made known to the software supplier. All the software supplier needs to know is an encoded number that identifies a customer and that distinguishes that customer from any other customer and the same is true with respect to the product information which is encoded. As shown in step 21, data received from the vendor, such as a list of all the products of the vendor, the attributes the vendor attaches to these products, and vendor purchase listings of these products, is inputted.

All of these data are preprocessed in order to make it more usable in connection with the present invention and also to achieve the results desired in the present invention by increasing the rapidity with which a list of products and related correlated products or recommendations can be delivered by a vendor to a prospective customer making possible the use of less computer time.

As shown in step 22 a look-up table is prepared for the attributes by product of the products in the database. Thereafter, as shown in step 23, there is prepared a look-up table for the products by attributes. By preparing these look-up tables it is possible for the computer to rapidly search for products and for attributes thereof.

After the data set has been prepared in this manner, the data set can be utilized in the following manner. As shown in step 24, a product is selected with the objective of finding other products that are in some sense similar to the selected product for recommendations as hereinafter described. Selecting this product utilizes an encoded number which is selected from the sequence of encoded numbers. As soon as the product has been selected, the attributes of the selected product are looked up in step 25 in the look-up table generated in step 22. If the attributes are numerous for a particular product, they can be placed in the look-up table in a hierarchical tree in which the root node or root category would be a broadly based attribute and branches leading therefrom can be more specific attributes. Thus, it is possible in certain situations to make logical connections at higher levels of the hierarchical tree before going to the branches for more specific attributes to find logical connections between attributes.

After the attributes of the selected product have been ascertained in step 25, two different approaches are available in conjunction with the method of the present invention. At this point in time the question is asked whether there are sufficient purchase data for this product as represented by the decision block 26. If the answer is yes, the steps shown on the right-hand side of FIG. 2 are undertaken. This includes the step 27b of looking up all the products that were purchased by a customer who purchased the selected product to provide additional selected products. All of these additional selected products are ranked by a correlation index as for example an index running from 1 to 10, characterizing the confidence in the correlation of the products. The correlation index is computed as follows. From the purchase data supplied by the vendor, the supplier knows the number of customers who purchased product A. and also purchased product B. From this same purchase data there also is ascertained the number of customers who purchased product A but not product B, the number of customers who purchased product B but not product A, and the number of customers who bought neither. From these four numbers the linear correlation between products A and B is established. An estimator of the likelihood that a customer who purchased product B would also purchase product A is constructed as a linear relationship between the probability of purchasing product A and that of purchasing product B. The mean of the estimator (the slope of the linear relationship) is proportional to the linear correlation between the two products. The intercept of the linear relationship is determined by the standard error of the estimator. The correlation index is a linear combination of these two values. Thereafter, as shown in step 28b, there is selected for the ranked additional selected products all products that match the selected product on at least one attribute. This data is then used to generate an output list of at least one of the best matches of correlated products as shown in step 29.

If there is insufficient purchase data to generate a list of additional selected products for the selected product and the answer is "no", the steps shown on the left-hand side of the diagram shown in FIG. 2 are performed. Thus, as shown in step 27a, all products are looked up that match at least one of the looked-up attributes of the selected product to provide looked-up products. In doing this, the look-up table prepared in step 23 is utilized. Thereafter, as shown in step 28a, there is selected from the looked up products all products that are the closest match to the selected product using predetermined attribute-related criteria. By way of example of this predetermined attribute-related criteria, one criterion could be all products that match on the one attribute and that has the least number of products in it. Another criterion could be all of the products that have the largest number of attributes in common with the selected product. This latter criterion is based on the principle that the more attributes the two products have in common, the more similar they are. In either event, there is the attempt in the present method to obtain looked-up products that constitute the closest matches to the selected product based solely on attributes. Thereafter, as shown in step 29, an output list of best matches is provided. Thus in accordance with the present invention the output list always includes best matches based upon at least one attribute of the selected product even though purchase data is available. In the event there is insufficient purchase data, the steps 27b and 28b would not be performed and only the steps 27a and 28a would be performed. In any event, the output list of best matches includes matches based upon at least one attribute.

Assuming that additional selected products are of interest, the steps 24-29 are performed for other selected products to provide a plurality of output lists of best matches as shown in step 31.

Thereafter, in accordance with the present invention it may be necessary to narrow down the lists of best matches to provide a meaningful number useful to the vendor and to a prospective customer. Thus as shown in the chart in FIG. 3, all of the best matches for a selected product are input for a selected product as shown in step 32 and ranked according to a vendor-assigned desirability as shown in step 33. Different types of vendor-assigned desirability can be utilized. For example a vendor could ask that the best matches be rated in the order of a sales rank with the better selling products being ranked higher than the poorer selling products. The rank could also be based upon a vendor's desirability to promote certain products. The vendor could also rate the products in accordance with profit margins to the vendor. Thus it can be seen that any type of vendor-assigned desirability can be utilized for the ranking.

After the ranking has been established for the best matches for the selected product, the top "n" products from the ranked correlated products or recommendations can be recommended by the vendor. Thus by way of example the top three or the top five products on the best matches list can be recommended as shown in step 34. Thereafter, a list of products and their related recommendations to the vendor can be prepared as shown in step 35 for delivery to a prospective customer.

A list of such products generated in accordance with the present invention can be of the type set forth below.

| LIST OF RECOMMENDATIONS | | | |
| --- | --- | --- | --- |
| Sequence # of selected Product | Sequence # of recommended Product | Recommendation order of recommended Product | Recommendation type |
| 1 | 10 | 1 | 3 |
| 1 | 101 | 2 | 3 |
| 1 | 134 | 3 | 3 |
| 1 | 100115 | 4 | 1 |
| 1 | 215678 | 5 | 1 |
| 2 | — | — | — |

In connection with the list set forth above, there is listed the selected encoded product sequence number which is the same number which was supplied by the vendor as a unique identifier for the selected product. In the second column there is provided the encoded sequence number of the recommended product. The third column gives the recommendation order of the recommended product and the fourth column gives the recommendation type. Thus in the above example for the selected product, encoded product 1, the most highly recommended product is the product having an encoded sequence number of 10 with the recommended order being 1 with the fourth column giving the type of recommendation used. For example, the type of recommendation used may correspond to whether the recommendation comes from the looked-up product as in step 27a of FIG. 2 or from the additional selected products as in step 27b of FIG. 2. As also shown by the list, the second recommendation has the encoded sequence number of 101 and is also recommendation type 3. The third recommended product bears the encoded sequence number 134 and also is of recommendation type 3. The fourth product recommended has an encoded sequence number of 100115 and was of recommendation type 1, and the fifth recommendation for the selected product 1 was sequence number 215678 from recommendation type 1. As shown, the same type of table can be generated for other selected products. Thus for example a selected product having an encoded sequence number of 2 can also be provided with five recommended products in the same manner.

Thus by way of example if a vendor has 2 million products, the vendor in accordance with the present invention would be supplied a file that contained 10 million rows of data i.e. five rows of data for each selected product with each selected product being one of the 2 million products. This data based on attributes of the product can then be supplied to the vendor as hereinbefore described in a machine readable file or as software to the vendor's database 12. Thus assuming the vendor has 2 million products, the vendor would be supplied with a recommendation list for each product of the 2 million products.

At the choice of the vendor as shown in FIG. 1, the vendor can make this software data supplied it accessible at a vendor website 51. Also the software can be utilized for context-sensitive advertising as shown by block 52 or it can be supplied to its own or independent retail stores 53 handling the vendor's products. The software can also be used for targeted advertising as shown by block 56 and in conjunction with email services as shown by block 57 which can be internal of the vendor or it can be in the form of an independent vendor supplying email services. The email services can be utilized for supplying recommendation lists of vendor products to past or prospective customers 59. As shown, those customers 59 can have access to the vendor's website 51 and also can have access to retail stores 53 which carry the products. Such retail stores can also have kiosks therein which can give access to the vendor database 12.

The vendor after receiving these lists of recommendations can tailor these lists to meet specific objectives of the vendor. For example let it be assumed that the vendor rather than displaying five recommendations only wishes to display two recommendations. The vendor in such a situation typically would utilize the first two recommendations in the recommendation list. The vendor can also tailor the customer recommendation list in accordance with the recommendation types to more specifically target a specific customer. The vendor can also place kiosks in retail outlets which would contain a browsable database. For example if the vendor is a wholesaler of books, the vendor could permit the retailer to have its customers search for titles of books and also to obtain recommendations based on the titles selected.

The vendor having knowledge of the purchaser or customer can generate for that customer context-sensitive advertising or targeted advertising. The vendor can also utilize the results of the present invention in any context where it is desirable to suggest to the customer additional items of interest that are related to items already selected by the customer for browsing.

In accordance with the present invention it should be appreciated that the method and apparatus of the present invention can be utilized with various types of products. Books are a good example. Other examples are video games, office equipment, computer equipment, all of which have attributes which can be categorized. In any use of the present invention, the attributes of the product would be always utilized in generation of the list of correlated products or recommendations. In addition or optionally, purchase data can be utilized as well as visits to websites. Articles that have been read by the prospective purchasers can be also utilized. In analyzing articles, key words can be utilized rather than attributes. The same principles of the present invention would still apply.

In accordance with the present invention it is not absolutely necessary to prepare the look-up tables but they are desirable because it makes the method of the present invention more efficient in the use of computer time. Because of the use of look-up tables, it has been found that in updating the data utilized by the method of the present invention as for example every week, it is desirable to re-input all of the data rather than augmenting the data that is already in the database.

In accordance with the present invention it can be seen that there has been provided a method for correlating product recommendations based on logical relations by product attributes. This method can be augmented optionally if desired with customer data purchases or other criteria. By utilizing product attributes, it is possible to generate lists of correlated products or recommendations which are much more relevant and are not prone to include inapt product recommendations. The method for producing lists of correlated products can be used in various ways in merchandising its products.

What is claimed:

1. A method, performed by a computing system having a processor, for generating a list of at least one correlated product to be supplied by a vendor to a prospective customer by the use of a computer, the method comprising:
   organizing, with the processor, into a searchable data set a plurality of products and attributes of each product;
   selecting, with the processor, a product having a plurality of attributes;
   ascertaining, with the processor, the plurality of attributes of the selected product;
   for each of at least two of the plurality of attributes, ascertaining, with the processor, all products that match the attribute of the selected product to provide looked-up products;
   selecting, with the processor, from the looked-up products all products that are the closest match to the selected product utilizing predetermined attribute-related criteria to provide best matches;
   generating, with the processor, an output list of at least one of the best matches from the looked-up products; and
   outputting the generated output list to the prospective customer,
   wherein the best matches are ascertained by utilizing predetermined attribute-related criteria and wherein one attribute-related criterion is all products that match on the one attribute that has the least number of products in it.

2. The method of claim 1 further comprising:
   inserting purchase data of the products into data structures;
   ascertaining all products that were purchased by a customer who also purchased the selected product to provide additional selected products;

ranking the additional selected products in accordance with a correlation index;

selecting from the additional selected products all products that match the selected product on at least one attribute; and preparing an output list of at least one of the best matches.

3. The method of claim 2 comprising:

ranking the best matches for a selected product in accordance with a relative benefit to the vendor of selling each of the best matches for the selected product; and preparing a list of recommendations for the selected product based upon the relative benefit ranking.

4. The method of claim 3 further comprising preparing the list with the top "n" products from the ranked best matches.

5. The method of claim 1 further comprising repeating the steps of obtaining an output list for each of a plurality of selected products.

6. The method of claim 1 further comprising preparing a look-up table for the attributes by product.

7. The method of claim 1 wherein one predetermined attribute-related criterion is all products that have the largest number of attributes in common with the selected product.

8. The method of claim 2 wherein the correlation index is determined by the number of customers who purchased both the selected product and the additional selected products.

9. The method of claim 2 wherein an estimator of the likelihood of purchase is calculated from the linear correlation between purchases of the selected product and the additional selected products.

10. The method of claim 9 wherein the correlation index is determined by a tradeoff of the mean and variance of the estimator of the likelihood that a customer who purchases the selected product would also purchase the additional selected products.

11. The method of claim 6 further comprising preparing a look-up table for the products by attribute.

12. The method of claim 11 wherein ascertaining the plurality of attributes of the selected product includes applying the look-up table for the attributes by product to the identity of the selected product; and wherein ascertaining all of the products that match at least one of the attributes of the selected product to provide looked-up products involves applying the look-up table for the products by attributes to the ascertained attributes of the selected product.

13. The method of claim 1 wherein a distinguished pair of the ascertained attributes of the selected product has a hierarchical relationship such that one attribute of the distinguished pair is a broadly based attribute, while the other attribute of the distinguished pair is a specific attribute; and wherein all products that match the broadly based attribute of the distinguished pair of attributes are ascertained before all products that match the specific attribute of the distinguished pair of attributes is ascertained.

14. The method of claim 1 wherein the ascertaining of all products that match an attribute of the selected product to provide looked-up products is performed for each of the plurality of attributes.

15. The method of claim 1, further comprising:

ranking the best matches for a selected product in accordance with a relative benefit to the vendor of selling each of the best matches for the selected product; and preparing a list of recommendations for the selected product based upon the relative benefit ranking.

16. The method of claim 1, further comprising:

preparing a look-up table for the attributes by product; and preparing a look-up table for the products by attribute, and wherein ascertaining the attributes of the selected products includes applying the look-up table for the attributes by product to the identity of the selected product, and wherein ascertaining all of the products that match at least one of the attributes of the selected product to provide looked-up products involves applying the look-up table for the products by attributes to the ascertained attributes of the selected product.

17. The method of claim 1, wherein a distinguished pair of the ascertained attributes of the selected product has a hierarchical relationship such that one attribute of the distinguished pair is a broadly based attribute, while the other attribute of the distinguished pair is a specific attribute; and wherein all products that match the broadly based attribute of the distinguished pair of attributes are ascertained before all products that match the specific attribute of the distinguished pair of attributes are ascertained.

18. The method of claim 1, further comprising:

ascertaining of all products that match an attribute of the selected product for each of the plurality of attributes.

19. A computer-readable device, that is not a signal, whose contents cause a computing system to generate a list of at least one correlated product to be supplied by a vendor to a prospective customer by:

organizing into a searchable data set a plurality of products and attributes of each product;

selecting a product having a plurality of attributes;

ascertaining the attributes of the selected product;

for each of at least two of the plurality of attributes, ascertaining all products that match the attribute of the selected product to provide looked-up products;

selecting from the looked-up products all products that are the closest match to the selected product utilizing predetermined attribute-related criteria to provide best matches;

generating an output list of at least one of the best matches from the looked-up products; and output the generated output list to the prospective customer, wherein the best matches are ascertained by utilizing predetermined attribute-related criteria and wherein one attribute-related criterion is all products that match on the one attribute that has the least number of products in it.

20. The computer-readable device, that is not a signal, of claim 19 further comprising contents that cause the computing system to:

rank the best matches for a selected product in accordance with a relative benefit to the vendor of selling each of the best matches for the selected product; and prepare a list of recommendations for the selected product based upon the relative benefit ranking.

21. The computer-readable device, that is not a signal, of claim 19 further comprising contents that cause the computing system to:

prepare a look-up table for the attributes by product; and prepare a look-up table for the products by attribute, and wherein ascertaining the attributes of the selected products includes applying the look-up table for the attributes by product to the identity of the selected product, and wherein ascertaining all of the products that match at least one of the attributes of the selected product to provide looked-up products involves applying the look-up table for the products by attributes to the ascertained attributes of the selected product.

22. The computer-readable device, that is not a signal, of claim 19 wherein a distinguished pair of the ascertained attributes of the selected product has a hierarchical relationship such that one attribute of the distinguished pair is a broadly based attribute, while the other attribute of the distinguished pair is a specific attribute; and wherein all products that match the broadly based attribute of the distinguished pair of attributes are ascertained before all products that match the specific attribute of the distinguished pair of attributes are ascertained.

23. The computer-readable device, that is not a signal, of claim 19 further comprising contents that cause the computing system to perform the ascertaining of all products that match an attribute of the selected product for each of the plurality of attributes.

24. The computer-readable device, that is not a signal, of claim 19 whose contents are further configured to cause the computing system to generate the list of at least one correlated product to be supplied by the vendor to the prospective customer by:

inserting purchase data of the products into data structures;
ascertaining all products that were purchased by a customer who also purchased the selected product to provide additional selected products;
ranking the additional selected products in accordance with a correlation index;
selecting from the additional selected products all products that match the selected product on at least one attribute; and
preparing an output list of at least one of the best matches.

25. The computer-readable device, that is not a signal, of claim 24 whose contents are further configured to cause the computing system to generate the list of at least one correlated product to be supplied by the vendor to the prospective customer by:

ranking the best matches for a selected product in accordance with a relative benefit to the vendor of selling each of the best matches for the selected product; and
preparing a list of recommendations for the selected product based upon the relative benefit ranking.

26. The computer-readable device, that is not a signal, of claim 19 whose contents are further configured to cause the computing system to generate the list of at least one correlated product to be supplied by the vendor to the prospective customer by:

preparing a look-up table for the attributes by product.

27. The computer-readable device, that is not a signal, of claim 19, wherein one predetermined attribute-related criterion is all products that have the largest number of attributes in common with the selected product.

28. The computer-readable device, that is not a signal, of claim 24, wherein the correlation index is determined by the number of customers who purchased both the selected product and the additional selected products.

29. The computer-readable device, that is not a signal, of claim 26 whose contents are further configured to cause the computing system to generate the list of at least one correlated product to be supplied by the vendor to the prospective customer by:

preparing a look-up table for the products by attribute.

30. The computer-readable device, that is not a signal, of claim 29 wherein ascertaining the plurality of attributes of the selected product includes applying the look-up table for the attributes by product to the identity of the selected product; and wherein ascertaining all of the products that match at least one of the attributes of the selected product to provide looked-up products involves applying the look-up table for the products by attributes to the ascertained attributes of the selected product.

31. A computing system for generating a list of at least one correlated product to be supplied by a vendor to a prospective customer by the use of a computer, the computing system comprising:

a memory; and
one or more processors configured to:
organize into a searchable data set a plurality of products and attributes of each product;
select a product having a plurality of attributes;
ascertain the plurality of attributes of the selected product;
for each of at least two of the plurality of attributes, ascertain all products that match the attribute of the selected product to provide looked-up products;
select from the looked-up products all products that are the closest match to the selected product utilizing predetermined attribute-related criteria to provide best matches;
generate an output list of at least one of the best matches from the looked-up products, and
output the generated output list to the prospective customer,
wherein the best matches are ascertained by utilizing predetermined attribute-related criteria and wherein one attribute-related criterion is all products that match on the one attribute that has the least number of products in it.

32. The computing system of claim 31, wherein the one or more processors are further configured to:

rank the best matches for a selected product in accordance with a relative benefit to the vendor of selling each of the best matches for the selected product; and
prepare a list of recommendations for the selected product based upon the relative benefit ranking.

33. The computing system of claim 31, wherein the one or more processors are further configured to:

prepare a look-up table for the attributes by product; and
prepare a look-up table for the products by attribute,
and wherein the one or more processors configured to ascertain the attributes of the selected products apply the look-up table for the attributes by product to the identity of the selected product, and wherein the one or more processors configured to ascertain all of the products that match at least one of the attributes of the selected product to provide looked-up products apply the look-up table for the products by attributes to the ascertained attributes of the selected product.

34. The computing system of claim 31, wherein the one or more processors are further configured to:

ascertain all products that match an attribute of the selected product for each of the plurality of attributes.

35. The computing system of claim 31, wherein the one or more processors are further configured to:

insert purchase data of the products into data structures;
ascertain all products that were purchased by a customer who also purchased the selected product to provide additional selected products;
rank the additional selected products in accordance with a correlation index;
select from the additional selected products all products that match the selected product on at least one attribute; and
prepare an output list of at least one of the best matches.

* * * * *